United States Patent
Tanksley

[11] 3,807,178
[45] Apr. 30, 1974

[54] FLOATING BOOM

[75] Inventor: Neeld D. Tanksley, Walnut Creek, Calif.

[73] Assignee: Pacific Pollution Control, San Francisco, Calif.

[22] Filed: June 16, 1972

[21] Appl. No.: 263,522

[52] U.S. Cl. .................................................. 61/1 F
[51] Int. Cl. .......................................... E02b 15/04
[58] Field of Search .............. 61/1 F, 5, 1; 210/242, 210/DIG. 21

[56] References Cited
UNITED STATES PATENTS

| | | | |
|---|---|---|---|
| 3,584,462 | 6/1971 | Gadd | 61/1 F |
| 3,537,587 | 11/1970 | Kain | 61/1 F X |
| 3,613,377 | 10/1971 | Zaugg | 61/1 F |
| 3,638,430 | 2/1972 | Smith | 61/1 F |
| 3,685,296 | 8/1972 | Bogosian | 61/1 F |
| 3,686,870 | 8/1972 | Blomberg | 61/1 F |
| 3,695,042 | 10/1972 | Demson | 61/1 F |
| 3,731,491 | 5/1973 | Markel et al. | 61/1 F |
| 3,739,584 | 6/1973 | Belin | 61/1 F |

Primary Examiner—Mervin Stein
Assistant Examiner—Philip C. Kannan
Attorney, Agent, or Firm—Warren, Rubin, Brucker & Chickering

[57] ABSTRACT

A floating boom is disclosed which includes an elongated sheet-like partition member and a plurality of float means demountably secured to the partition member in relatively spaced apart positions thereon. The float means are formed for rapid and easy attachment to the partition as it is unrolled from a reel during deployment of the boom and for rapid removal from the partition member when the boom is retrieved. The float means each are preferably provided with a relatively thin frame and a clamping means formed to allow selective clamping and release of a movable portion of the frame into and out of engagement with the partition sheet. The float elements are secured to the frame in an outrigger type of construction, which enhances stability of the water and provides a channel between the floats and the partition for passage of oil and water therebetween. A method of forming and deploying the floating boom and connecting the same with similar floating booms is also disclosed.

16 Claims, 7 Drawing Figures

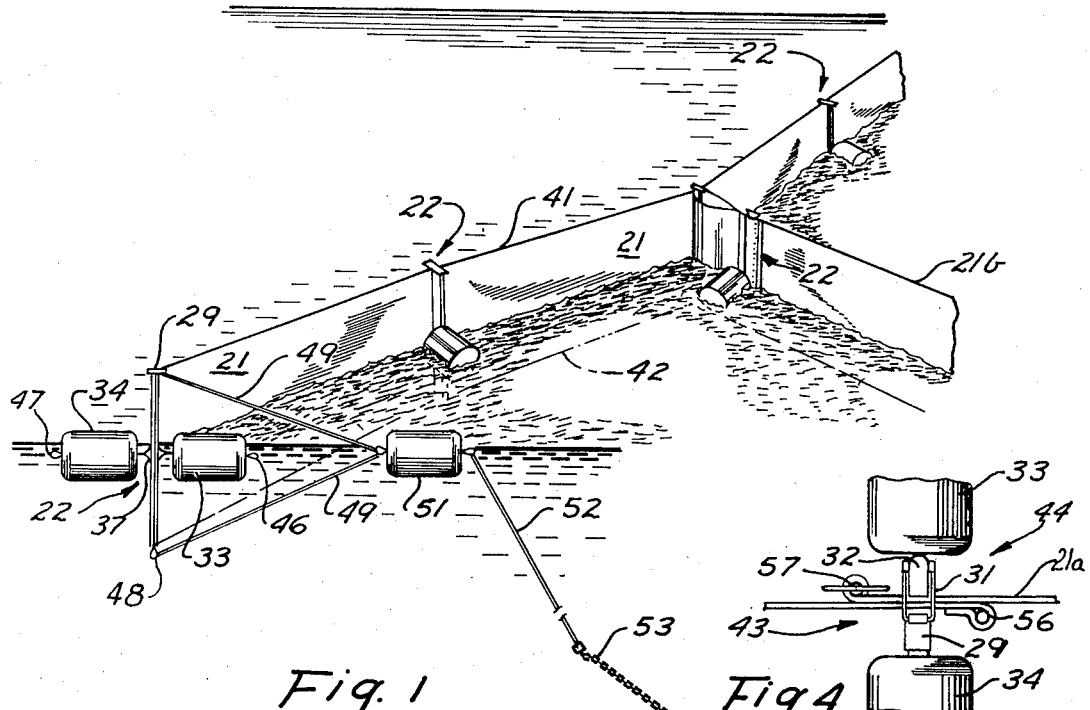
Fig. 1
Fig. 4
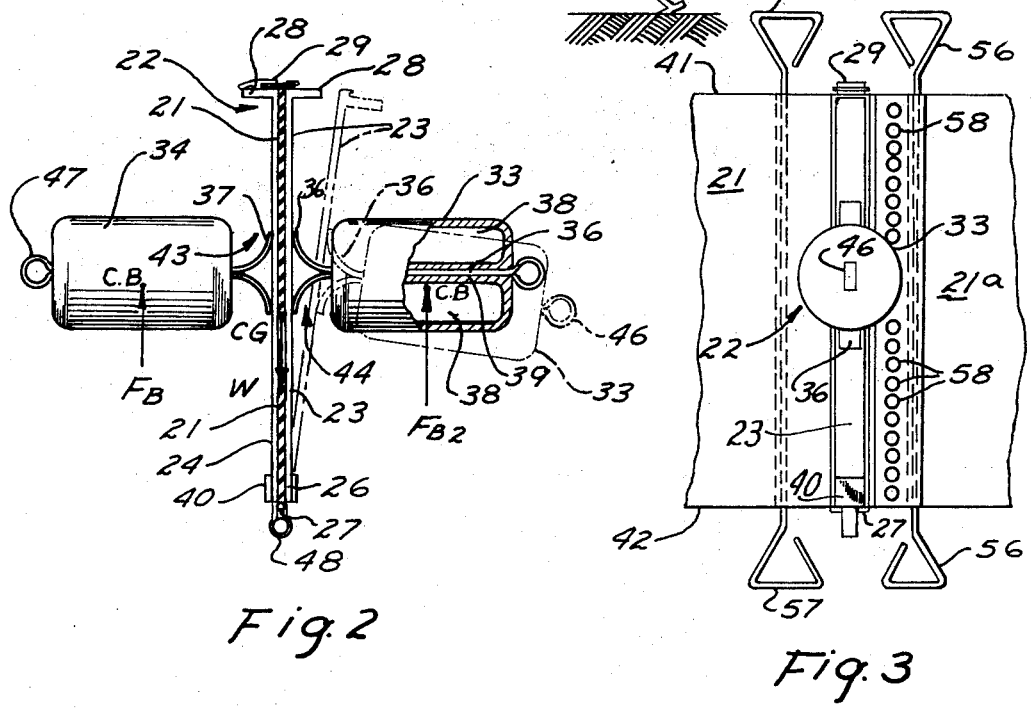
Fig. 2
Fig. 3

FLOATING BOOM

BACKGROUND OF THE INVENTION

In recent years substantial attention has been directed to the problem of controlling and picking up liquid pollutants which have been accidentally discharged into bodies of water. Part of this effort has been directed toward the development of an effective floating boom which can be used to control the liquid pollutant, such as oil, during the time in which the pollutant is being skimmed from the water surface, absorbed, coagulated, etc.

Several types of floating booms have been developed as part of pollution control systems. One type of boom which has frequently been employed as a barrier in the control of oil slicks is shown in U.S. Pat. No. 3,499,290. This boom is formed by a relatively rigid buoyant segment to which a weighted flexible skirt or partition member is secured. A similar inflatable boom is set forth in U.S. Pat. No. 3,476,246. Another type of floating boom which has been evolved employs a framework on which a partition material is stretched and to which floats are attached. The framework usually is collapsible, or can be disassembled, and U.S. Pat. No. 3,499,291 is typical of this type of construction. Additionally, floating booms have been devised in which the float elements are substantially permanently attached to an elongated partition member through openings positioned along the length of the partition. Typical of this type of approach is the boom of U.S. Pat. No. 3,537,587. Each of these various types of boom constructions have been found to be advantageous for certain applications. They have, however, been found to have limitations which are undesirable. Some of these booms are relatively expensive to construct, time consuming to deploy and bulky to store. Others have been found to lack stability under heavy wave action and unable to contain the oil slick which they seek to partition. Still others are difficult to clean after their use, cannot be easily towed once in the water, and are difficult to secure to other floating booms.

Accordingly, it is an object of the present invention to provide a floating boom which has improved stability in the water and which is more compact and conveniently stored.

It is another object of the present invention to provide a floating boom which may be rapidly deployed and retrieved and further may be easily joined or secured to other similarly formed booms.

It is another object of the present invention to provide a floating boom which is easy and inexpensive to manufacture, durable and relatively impervious to pollutants, and constructed in a manner allowing interchangeability of parts to solve varying types of containment problems.

Other objects and advantages of the floating boom and method of the present invention are set forth in or will be apparent from the following description.

SUMMARY OF THE INVENTION

The floating boom of the present invention is briefly comprised of a sheet-like partition member or barrier to which a plurality of floats are demountably attached. The floats include the frame on which float members are mounted and a movable portion of the frame which frictionally engages or clamps to the partition member. The partition member preferably is a flexible sheet deployed from a roll for convenience in storage, with the float members being periodically attached to the partition as it is unrolled and draped into the water. The float means which are clamped onto the partition are preferably constructed with float elements cantilevered off of each side of a central frame which is clamped to the partition. Such mounting of the floating elements provide an outrigger effect which insures great stability of the boom in water and allows passage of oil and water between the partition and the floats. The floats are constructed to allow convenient splicing of one partition member to another.

BRIEF DESCRIPTION OF THE DRAWINGS

FIG. 1 is a top perspective view of a floating boom constructed in accordance with the present invention.

FIG. 2 is an enlarged end elevational view, partially fragmented, of the floating boom of the present invention.

FIG. 3 is an enlarged, fragmentary, side elevational view of the floating boom of the present invention shown joining two overlapping partition members.

FIG. 4 is a top fragmentary view of the joined partition members illustrated in FIG. 3.

DESCRIPTION OF THE PREFERRED EMBODIMENTS

Figure 5:
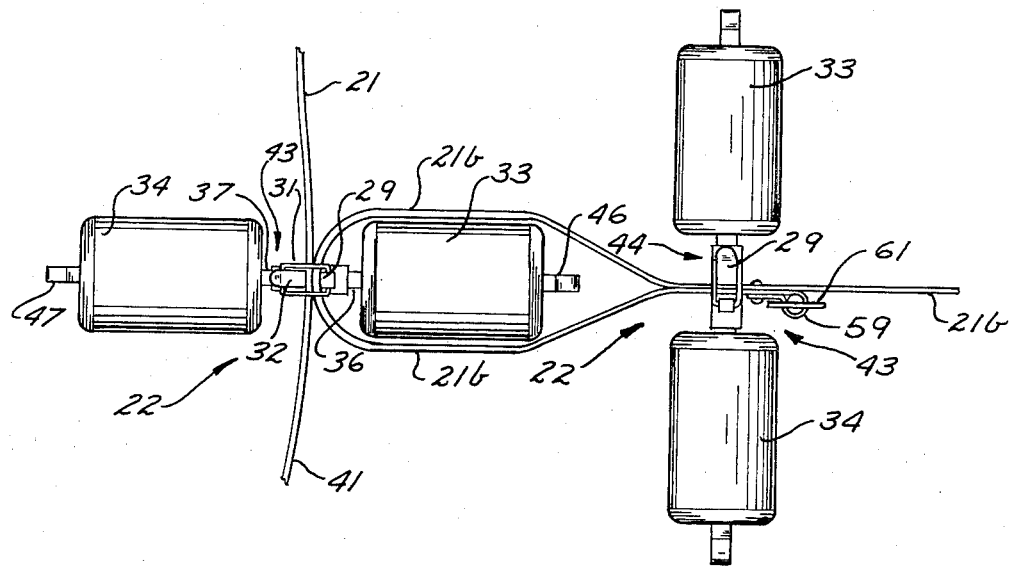
FIG. 5 is a top view of the floating boom constructed in accordance with the present invention and illustrating an alternative method of joining partition members.

Referring now to FIGS. 1–5, the floating boom of the present invention can be seen to be comprised of a sheet-like barrier or partition member 21 and a plurality of float means, generally designated 22, demountably secured to the partition at relatively spaced apart positions thereon. In order to allow the float means to be rapidly mounted on and removed from barrier 21, the float means are preferably formed with a frame having a movable portion for movement into and out of engagement with partition 21. As best may be seen in FIG. 2, the frame preferably includes a pair of juxtaposed upright members 23 and 24 hingedly secured at the lower ends 26 of the upright members by hinge element 27. As thus mounted, upright members 23 and 24 may be articulated about hinge 27 from a closed position as shown in solid lines in FIG. 2 to an open position as shown by phantom lines for member 23. For purposes of simplicity, only member 23 is shown in a displaced or articulated position, but it is preferable that both members 23 and 24 may be articulated to provide an opening at the upper end thereof for receipt of partition member 21. Thus, in the preferable form of the frame of the float means of the present invention, both members 23 and 24 provide movable portions which may be moved into and out of engagement with the partition member.

In order to facilitate rapid mounting of the float means to the partition, the upper ends 28 of upright members 23 and 24 preferably have clamping means 29 mounted thereto. The clamping means clamps the movable portion of the frame into frictional engagement with the partition member and is further formed for rapid release and removal of the frame from the partition member. As illustrated best in FIG. 4, the clamping means 29 is constructed as a quick release latch having a link 31 and manually engageable lever 32 in a manner similar to a suitcase-type latching mechanism. Other types of clamping means are equally suitable for the present invention, and a cam-operated latch may be particularly advantageously employed to accommodate various widths of partition elements 21. As may be seen in FIG. 2, the upright members are clamped in relatively spaced apart position to define a slot in which the partition member 21 is received. It is preferable that the slot between the opposed internal faces of members 23 and 24 be formed with a thickness dimension slightly less than the thickness of the partition member in order to obtain an interference fit between the upright clamping elements 23 and 24 and the partition 21. Such an interference fit ensures high frictional forces between the float means and the partition which in turn fixes the float at a particular location on the partition or barrier even under conditions of heavy wave action, currents or tides.

In order to provide proper buoyance for the barrier or partition 21, and the frames or the float means, both of which are normally not buoyant, at least one float element, and preferably two float elements, are mounted to the frame of the float means. In order to enhance stability of the boom of the present invention, it is preferable that a float element be disposed on either side of the partition member as shown in the drawings. Thus, float elements 33 and 34 are mounted on arms 36 and 37 which extend laterally from upright movable frame portions 23 and 24 and position the floats intermediately of upper edge 41 and lower edge 42 of the partition.

Float elements 33 and 34 must have sufficient buoyancy to float the segment of partition 21 to which they are attached. As shown in FIG. 2, buoyancy is achieved by forming the float members as a hollow shell having annular cavity 38, with arm 36 passing through a passageway in the central portion 39 of float 33. As thus constructed, the float members are readily injection molded from a plastic material, such as nylon or a polyolefin which can be washed with solvent to remove oil or other pollutants adhering to the floats prior to storage of the floating boom. Alternatively, float elements 33 and 34 can be formed of or filled with a closed cell foam which will provide substantial buoyancy. If not contained within a skin, the foam may be coated with a coating on the exterior surface in order to enable cleaning of oil therefrom or it may be uncoated and the adherence of oil to the floats merely tolerated.

The amount of buoyancy provided by the float elements can vary substantially without interfering with the function of the floating boom of the present invention. Since the float means 22 may be secured to partition 21 at virtually any spacing interval over the length of the partition, it is relatively easy, using the float means construction of the present invention, to form a floating boom which will have sufficient buoyancy to maintain the partition in a generally vertically oriented position. Thus, if the float elements are relatively small, the float means can be located closer together, or if the float elements have a high degree of buoyancy, the frames for the floats can be secured to the partitions at relatively large intervals. The spacing of the float means over the length of the partition and the buoyancy of the float elements should be selected so that at least a portion of the partition 21 is disposed above the top surface of the water to prevent spilling of oil over the barrier or boom under wave action, wind, etc. As will be understood, it is not essential that the partition be perfectly vertically aligned, and, in fact, it will only rarely be so aligned. The floating boom of the present invention will constantly be oscillating about a vertical axis under wave and wind action, and even in still water, imbalances between the buoyancy of the floats may cause the partition to be canted to one side or another off the vertical axis.

It is a further feature of the floating boom of the present invention that the frame preferably be formed to clamp around and encircle the entire breadth or heighth of the partition with clamping means 29 adjacent upper edge 28 of the frame members and hinge 27 positioned at the lower edge 26 of the frame members. This construction results in the floating boom being stable and held in upright position in the water, even if the clamping means 29 should fail and become unclamped. Thus, as best may be seen in FIG. 2, opening of the clamp 29 would tend to cause the upright members to fall to the open position as indicated by the dotted lines. The buoyant forces, however, on the floats 33 and 34 working against the center of gravity of the partition 21 tend to urge the upright members toward closed position. Hinge 27 prevents the partition from slipping down past the floats. Thus, the floats will be held on the partition even if the clamp should open. The primary disadvantage of accidental opening of the clamp would be that wave action might carry the float means longitudinally down the partition. Since the clamping mechanism may typically be used in salt water, corrosion and failure of the clamp is a possibility, but the construction of the float means of the present invention maintains the clamp above water and makes the floating boom failsafe should the clamp release. It might be noted, further, that the float means could be inverted and clamped with the clamping means adjacent the lower edge of the partition (the arms 36 and 37 should be moved so that the centers of buoyancy of the floats are above the center of gravity of the frame and partitions), and the device would function properly. In this construction, however, the clamp would be submerged and constantly subjected to contact with salt water, and failure of clamping means 29 would result in the partition dropping downwardly out of the float, with potentially disastrous effect.

Since wave action and wind will tend to tip the floats and partition, it is an important feature of the present invention that the center of gravity of the partition and the frame of float means 22 be positioned between and below the centers of buoyancy of float elements 33 and 34. As will be seen in FIG. 2, the centers of buoyancy (C.B.) of elements 33 and 34 are located at the center of gravity of the water displaced by the volume of these elements. The weight, W, of the frame and partition act through the center of gravity, (C.G.). Since the centers of buoyancy of the two float elements are at laterally spaced distances from each side of the partition and the center of gravity of the float means, there is an outrigger effect giving the overall combination substantial stability. Additionally, if the partition and float means are tipped under wave action, the center of gravity and the center of buoyancy of the downwardly displaced float elements will form a couple causing the float element and partition to again assume an upright position. To insure location of the center of gravity below the centers of buoyancy weight 40 may be secured to the frame of the floats. Thus, in actual use the floating boom of the present invention has been washed or deflected over to a horizontal position under wave action and still it will right itself to the position shown in FIG. 2 by reason of the couple between the center of gravity and the center of buoyancy.

An additional feature of the floating boom of the present invention is that several different types and kinds of partitions can be employed with the clamp-on type of float means. It is preferable to use a partition member which is formed of a solid water impervious flexible material such as synthetic or natural rubber having reinforcing fibers running therethrough or polyurethane covered and nylon reinforced belting. This type of material is relatively corrosion resistant and will not be attacked by most pollutants or salt water. Additionally and very importantly, flexible sheet material can be rolled into a roll on a reel for easy deployment and compact storing. Still further, flexible barrier materials of this type are capable of flexible movement in response to the wave action and undulations of the body of water in which they are deployed. Thus, the floating boom can be deflected without undue strain or damage under the forces which can be quite high, depending upon the nature of the body of water in which the boom is deployed. As will be set forth in more detail in connection with FIGS. 6 and 7, a screen material can be substituted for the solid partition 21, and various other materials having mechanical and chemical properties desirable in light of the application to which the floating boom is put may be substituted for the rubber sheet barrier.

Since it is desirable to use a flexible partition, particularly because of its desirable accommodation to motion in the water, it is a further feature of the present invention to form the frames of the float means 22 in a manner which will not interfere with the flexing action of partition 21. As best may be seen in FIG. 5, partition 21 will be deflected under wave, current and tide action, and the clamping upright members 23 and 24 only engage a relatively small width of the barrier, as compared to the height of the clamping members, and therefore do not create a rigid planar surface along the length of partition 21. The relatively narrow width of members 23 and 24 allows the floats to twist about a vertical axis through the frame to further accommodate the wave forces and water movement. Thus, the floating boom has an inherent flexibility necessary in order to prevent undue stress and failure or severing of the boom under surges in the water.

The buoyant elements 33 and 34 may take several different forms. The stability of the float means of the present invention, however, is enhanced when the float elements are elongated bodies with the longitudinal axes oriented substantially perpendicular to the partition member. In FIG. 2, this configuration will be seen to cause the centers of buoyancy to be at a spaced distance from the partition which enhances the outrigger effect and stability of the float in the water. By comparison, the centers of buoyancy of the float elements in FIGS. 6 and 7 are much closer to the partition member and the floating boom constructed in this manner is, to some extent, less stable than the form as illustrated in FIGS. 1-5.

One common use of a floating boom is to partition off a channel having a current coming in a predetermined direction. In this type of application, the boom is placed across the channel at an angle to the flow, causing the pollutants to be deflected to a collecting area adjacent the most downstream end of the boom. It is a very important feature of the present invention, that the float elements are mounted on the frame on cantilevered resilient arms at laterally spaced distances from the side of partition member 21 to define passageways 43 and 44 between the floats and the partition for the flow of liquids between the floats and the partition. Thus, pollutants which impinge upon the barrier or partition 21 will be carried by the current longitudinally along the barrier and between the barrier and the floats to the collecting area at the downstream end of the boom. Similarly, fire hoses can be used to direct the flow of pollutants along the partition and past the float elements by reason of these passageways.

Resilient mounting of arms 36 and 37 allows the float means to accommodate wave action without undue stress on the boom. Thus, an advancing wave will temporarily upwardly displace a float element due to the resilient cantilevered mounting on arms 36 and 37, and when the wave impacts the partition, the float element will be displaced downwardly to its normal position.

Since towing and anchoring of floating booms is often required or desirable, the floating boom of the present invention is preferably formed with line receiving openings at the ends of arms 36 and 37 as indicated by loops 46 and 47. Additionally, the frame may be formed with a line receiving opening or loop 48 adjacent lower end 26 thereof. The loops or eyes 46 and 47 further hold the float elements on arms 36 and 37. As shown in FIG. 1, a line 49 passed through loop 48 and top clamp 29 can be used together with an additional float 51, line 52, which is secured to a chain 53, and anchor 54 to anchor the floating boom against a current. Similarly, a line can be run down several successive loops 46 and used to tow the boom. It should be noted in connection with the towing of the boom that it is advantageous to have the float members formed in a manner allowing them to be twisted or displaced so as to minimize the drag of the floating boom as it is being towed through the water.

In order to facilitate the mounting of the floating means 22 on partition 21, the eye or loop 48 is preferably formed as a resilient spring material which biases upright members 23 and 24 to the open position illustrated by the phantom lines in FIG. 2. Thus, upon release of clamp 29, the spring 48 biases upright members to an open position to allow removal of the floats from the barrier.

Since it is often desirable to splice or join adjacent floating booms in either end-to-end relationship or perpendicular relationship intermediate the ends of a boom, the float elements of the present invention are advantageously constructed to allow easy splicing or joining of adjacent booms. As shown in FIGS. 3 and 4, a second barrier or partition 21a is joined to partition 21 by means of single float means. The second elongated sheet-like partition member is positioned, best seen in FIG. 4, to overlap a portion of the length of the first partition member 21. Float means 22 is then opened and the overlapped portion of partitions 21 and 21a are inserted between upright members 23 and 24 and clamped by clamping means 29 so as to frictionally engage both of said partition members. As will be seen, it is preferable to form the partition members with rods 56 and 57 having manually engageable ends which can be used to roll the partitions upon during storage. The rods additionally will prevent the overlapped portions from pulling through float means 22. The rods are held in the end partitions by suitable fasteners such as rivets 58.

Figures 6, 7:
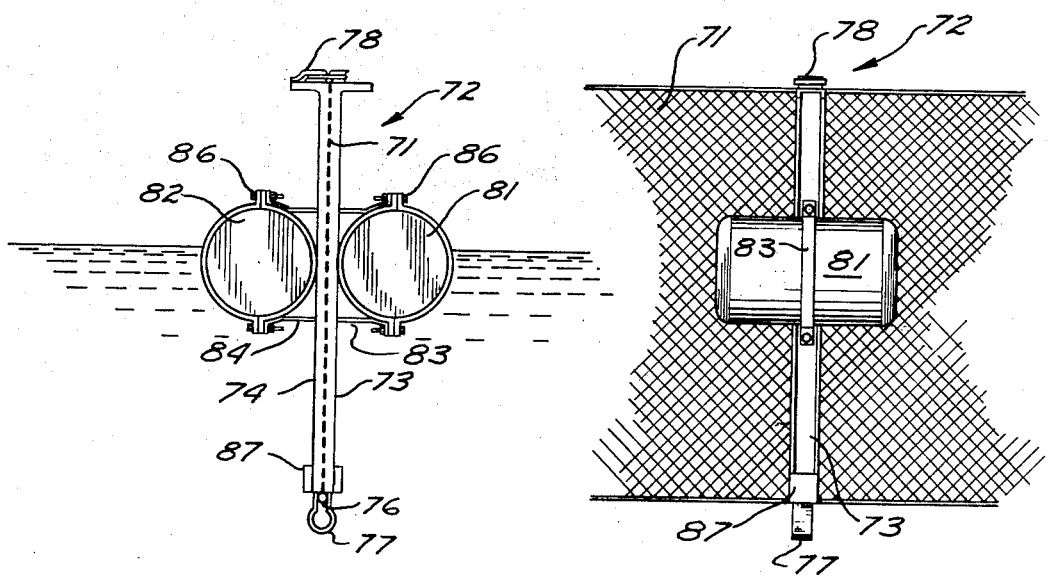
FIG. 6 is an end elevational view of an alternative embodiment of the floating boom constructed in accordance with the present invention.
FIG. 7 is a fragmentary side elevational view of the floating boom of FIG. 6 and including a screen partition member.

In FIGS. 1 and 5, the attachment of a second partition 21b in the middle of and generally perpendicular to a first partition 21 is shown. Partition or barrier 21b is formed with a loop in the end thereof and a float means used to clamp a portion of the loop to partition 21. A second float means is used to clamp the end 59 against the rest of the barrier 21b. As thus clamped, rod 61 prevents end 59 from being pulled through the float means 22 and the float means on barrier 21 secures barrier 21b.

Referring now to FIGS. 6 and 7, an alternative embodiment of the floating boom of the present invention is shown. The float means, generally designated 72, is used to support and float a screen-like partition 71 and is demountable therefrom in a manner similar to that described in connection with FIGS. 1–5. Float means 72 includes upright channel members 73 and 74 which are hingedly secured by hinge element 76 and biased by spring element 77 to an open position upon release of clamping means 78. Accordingly, the frame of the float means of FIGS. 6 and 7 is operated in the same manner as above described in connection with float means 22. In this embodiment, however, float elements 81 and 82 are mounted to upright members 73 and 74 by encircling bands 83 and 84, which act as arms. Fasteners 86 are provided in order to allow replacement of float elements 81 and 82 should they become damaged. While in most applications, the distance to which the float elements extend laterally from the partition is not too critical, in some applications it is advantageous to dispose the float elements immediately adjacent partition 71. Weight 87 may be added to increase stability by lowering the center of gravity of the float.

The use of a screen as a partition or barrier member is particularly advantageous when the floating boom is to be employed in connection with an oil absorbent material, such as an open celled foam, placed in the water. A section of the floating boom may have the screen partition 71 instead of a solid partition, with the screen size being selected so as to allow passage of water therethrough, but retain and trap the particles of absorbent, which have absorbed the oil deposited on the water. Similarly, in situations in which the material is not a liquid, a screen-type barrier can be advantageously employed since it is not subjected to the same forces as would be a solid barrier and would be effective in screening out the solid pollutants.

In operation the floating boom of the present invention is deployed preferably from a reel (not shown) with a roll of the flexible elongated partition stored on the reel. The flexible barrier can be rolled into a roll for storage and that roll can be easily and conveniently transported to a deployment site. At the deployment site, the rolled partition can be unrolled and float means 22 or 72 clamped or secured to the partition at periodic spaced locations on the partition. It should be noted that the location of the center of gravity of the float means allows the partition to be deployed from a roll mounted on a reel formed to unwind about a horizontal axis. As the partition material is unrolled, the weight of the floats clamped onto the partition will cause the flexible partition to twist 90° and assume a proper orientation as the partition is introduced into the water. On retrieval of the floating boom, the end of the boom may be secured to the reel and then pulled in, with each float means being removed as it is encountered and reaches the reel during the rolling up process. The spring biasing of the clamping frame members and the quick release of the clamping means allows the floats to be rapidly removed from the partition.

In actual use, it has been found that 300 foot lengths of floating boom, constructed as illustrated in FIGS. 1 through 5 can be deployed in 12 minutes or less. Retrieval of a 300 foot length of floating boom requires about 8 minutes. The partition which has been found to be particularly advantageously employed in the floating boom in the present invention has a height of about 24 inches, about 9 to 11 inches of which protrude above the water. The float elements have a diameter of about 6 inches and a length of about 10 inches and are secured to the upright members at about 15 inches from the lower end of the frame. The frame including the arm members may be formed of 304 stainless steel, with the upright members preferably having a U-shaped channel cross section for additional rigidity to ensure good frictional engagement of the partition. In addition to hollow nylon float elements, closed cell polystyrene foam having a density of about 2 pounds per cubic foot and formed in a 6 by 10 inch cylinder will provide satisfactory float elements for support of the partition member. These float elements are typically attached at about every 4 to 5 feet along the length of a ¼ inch thick nylon reinforced polyurethane covered partition sheet.

I claim:

1. A floating boom having demountable float means comprising:
   a. an elongated sheet-like partition member; and
   b. a plurality of float means demountably secured to said partition member at relatively spaced apart positions forming segments thereon, each said float means including:
      1. a frame having a movable portion formed for movement into and out of engagement with said partition member,
      2. at least one float element mounted on said frame and formed to have sufficient buoyancy to float said frame and the segment of said partition member having said float means attached thereto in water with said partition member being generally vertically oriented with at least a portion of said partition member disposed above the top surface of the water over the length of said segment, and
      3. clamping means mounted on said frame and clamping said movable portion of said frame in frictional engagement with said partition member to secure said frame thereto, said clamping means being further formed for release of clamping forces and removal of said frame from said partition member with said float element mounted on said frame.

2. A floating boom as defined in claim 1 wherein, said frame and said clamping means are formed to encircle the breadth of said partition and each said float means includes a plurality of float elements secured to said frame with at least one float element disposed on either side of said partition member in a position intermediate of the upper and lower edges of said partition member.

3. A floating boom as defined in claim 2 wherein, said clamping means is disposed adjacent the upper edge of said partition member and said movable portion of said frame is articulated to the remainder of said frame adjacent the lower edge of said partition member.

4. A floating boom as defined in claim 3 wherein, said partition member is formed of a solid water impervious flexible material suitable for flexible movement in the water and for storage in a roll upon removal of said floating boom from the water.

5. A floating boom as defined in claim 4 wherein, each of said float means is formed with a frame having a movable portion of relatively small width as compared to the height thereof to enable said float means to twist about a vertical axis through said frame during undulations of said partition under wave action.

6. A floating boom as defined in claim 1 wherein, said partition member is provided by a screen-like member formed for passage of water therethrough.

7. A floating boom as defined in claim 1 wherein, said float elements are each mounted on said frame on cantilevered resilient arms from said frame at laterally spaced distances from each side of said partition member to define a passageway between said float elements and said partition member on both sides thereof for passage of liquid between said float elements and said partition member.

8. A floating boom as defined in claim 7 wherein, each float element is formed with an elongated body and is secured to said frame with the longitudinal axis thereof substantially perpendicular to said partition member.

9. A floating boom as defined in claim 1 wherein, each said float means is formed with a frame including a pair of juxtaposed upright members hingedly secured at the lower ends thereof, said clamping means being positioned at the upper ends of said upright members and being formed to secure said upright members in adjacent juxtaposed relatively spaced apart position to define a slot therebetween for receipt of said partition member, said slot being formed with a smaller thickness dimension than the thickness of said partition member for an interference fit with said partition member on clamping.

10. A floating boom as defined in claim 9 wherein, said frame is further provided with a pair of generally horizontally extending arms with one of said arms being resiliently cantilevered and extending outwardly from each of said upright members, said arms each having float elements secured thereto, and wherein, each of said arms is formed with a line receiving opening adjacent the lower ends thereof, said line receiving opening on said upright members being provided by a spring member formed to bias said upright members to an open position for receipt and removal of said partition member.

11. A floating boom as defined in claim 1 and, an elongated sheet-like second partition member, said second partition member being positioned to overlap a portion of the length of the first named partition member, and at least one of said float means being positioned with said movable portion of said frame frictionally securing and joining said first named partition member to said second partition member.

12. The method of forming and deploying a floating boom comprising the steps of:
   a. rolling a flexible elongated sheet-like partition member into a roll for transportation to a deployment site;
   b. transporting the rolled partition member and a plurality of float means to the deployment site, each said float means being formed for releasable attachment to a portion of said partition member; and
   c. at said deployment site, unrolling said partition member and during said unrolling step attaching said float means to said partition at periodic spaced apart locations on said partition member as said partition member is placed in the water.

13. The method of forming and deploying a floating boom as defined in claim 12 and the additional step of:

retrieving said floating boom by pulling in and rolling up said partition member while removing each float means from said partition member as encountered during the rolling process.

14. The method of forming and deploying a floating boom as defined in claim 12 and the additional step of:

attaching a second floating boom formed as an elongated sheet-like second partition member to the first named floating boom by overlapping a portion of said second partition member with a portion of the first named partition member and securing said partition members against relative separation by clamping a float means in frictional engagement with both of said partition members.

15. In a floating boom having an elongated sheet-like partition means, and a plurality of compact float means secured to said partition means at relatively spaced apart intervals therealong with substantial lengths of said partition means therebetween, the improvement comprising:
   each said float means including mounting means adapted for rapid securement of said float means to and rapid demounting of said float means from said partition means, said mounting means further being adapted to maintain said partition means distended and in general vertical orientation upon securement to said partition means, and each said float means including a pair of float elements positioned on opposite sides of said partition means at spaced distances therefrom to define passageways between said partition member and said float elements for the passage of fluids therebetween.

16. A floating boom as defined in claim 15 wherein, said mounting means includes a frame formed for slidable mounting onto and demounting from said partition means and a latch means formed to enable selective securement and release of said float means to and from said partition means, and said partition means is formed of a solid water impervious flexible material suitable for flexible movement in the water and for storage in a roll upon removal of said floating boom from the water.

* * * * *